UNITED STATES PATENT OFFICE.

LINWOOD T. RICHARDSON, OF MILWAUKEE, WISCONSIN, ASSIGNOR TO THE CUTLER-HAMMER MFG. CO., OF MILWAUKEE, WISCONSIN, A CORPORATION OF WISCONSIN.

PROCESS OF PRODUCING MOLDED PRODUCTS.

1,342,067.  Specification of Letters Patent.  Patented June 1, 1920.

No Drawing.  Application filed June 6, 1918. Serial No. 238,463.

*To all whom it may concern:*

Be it known that I, LINWOOD T. RICHARDSON, a citizen of the United States, residing at Milwaukee, in the county of Milwaukee and State of Wisconsin, have invented a new and useful Improvement in Processes of Producing Molded Products, of which the following is a specification.

This invention relates particularly to the production of molded products comprising or containing a phenolic condensation product.

The primary object is to provide a practicable and economical quick-molding process of producing molded articles comprising a suitable filler and a binder comprising a phenolic condensation product.

It is well known that molded articles may be produced by a hot-molding process, from fillers and binders comprising a phenolic condensation product. The hot-molding processes, as generally practised in this art, however, ordinarily require the use of molds for a period of several minutes. The time may range, perhaps, from about two minutes for the smaller and simpler articles, to say fifteen minutes for the larger or more complicated articles. In any case, the output of a given mold is very limited, so that a large number of expensive molds and a large equipment of presses, etc., is required where any considerable output of molded product is essential.

In a prior art patent it has been proposed to preliminarily prepare a soluble condensation product of phenol and formaldehyde (40% aqueous solution), the formaldehyde being preferably used in decided excess; to obtain in this manner a thin mass and mix the same with a filler, employing a solvent, such as glycerin, alcohol, acetone, or the like, if necessary; mold the mixture under pressure; and harden the molded article by subjecting it to the action of heat after removal from the mold. The method proposed is open to the objection that water is present in the formaldehyde solution, and water is also produced in the chemical re-action which occurs during the heat treatment. Also, the formaldehyde employed is of a very volatile nature, and there is great difficulty in determining the correct proportions, owing to the fact that the loss of formaldehyde cannot be known with certainty. Again, it is difficult to sufficiently remove the water from the initial resin without either causing a large escape of formaldehyde or carrying the re-action to a point which renders the material unfit for use in a quick-molding process, and the method is open to the further objection that it requires a series of specific gravity tests to determine the point at which the condensation product is of the correct consistency for mixing with the filler.

Another very serious objection to the process described in the above-mentioned patent is that a phenol-formaldehyde resin having a specific gravity within the limits mentioned in said patent corresponds with a re-action product between phenol and formaldehyde, taken in the proportion stated in the patent, which is about two-thirds (or more) complete; that is to say, the lowest limit (sp. gr. 1.15) mentioned in the patent corresponds with a phenol formaldehyde resin in which about 65% of the phenolic body has combined with the formaldehyde, while the upper limit (sp. gr. 1.21) corresponds with such a resin having about 80% of the phenolic body combined with the formaldehyde. This means that the re-action has proceeded too far to permit of proper welding of the particles in a quick-molding process, assuming that a proper admixture of the binder with a filler could be secured, which would be difficult, if not impossible. The desirability of eliminating water formed as a by-product (as well as water of solution) leads to this difficulty. The result is an almost worthless product having very low tensile strength, a low dielectric constant, and high water-absorptive qualities.

So far as I am aware, the proposed method referred to above has not found its way into use; and it is to be observed that because of the vast economy which can be effected by a suitable quick-molding process for phenolic condensation products, there is every reason to expect any practicable process of this character to come quickly into general use.

The improved process herein described obviates the difficulties mentioned, may be practised with facility, and enables highly satisfactory molded articles comprising a phenolic condensation product and a filler to be produced in large quantity, with limited equipment, and with vast economy of manufacture.

A preferred example of the improved process may be stated as follows:

Take 324 pounds of a phenolic body, such as cresol, mixed with 70 pounds of hexamethylenetetramin; heat the mixture in a suitable vessel or still, preferably to about 220° F., continuing this treatment for a short period, depending upon the quantity; discontinue the application of heat and allow the re-action to proceed until about one-third of the nitrogen of the hexamethylenetetramin has been expelled as ammonia; then stop or quench the re-action by adding light coal tar oil, preferably about 5% by weight, of the mass at this time, which in this case would amount to about nineteen pounds, supplementing this action, if necessary, by circulating cooling water through a jacket of the still; mix 400 pounds of resin prepared in this manner with 1000 pounds of asbestos filler, stirring the batch in a mixer until a homogeneous mixture is secured, the mass becoming automatically heated during this operation; cool the mixture, which becomes balled into masses during the mixing operation, and dry in the open air or by an air current, if necessary; then break the masses of the material in a disintegrator of the impact type, and grind to a size which can be easily introduced into the molds, a suitable size being, for instance, that which will pass through a ten-mesh screen.

Having produced a molding compound in this manner, the material is introduced into the molds and molded quickly under high pressure, say from three to five tons per square inch, either at room temperatures, or, if desired, in dies heated in such a manner as not to interfere with the rapid operation; then remove the molded article from the molds and subject the same to prolonged heat treatment, which may be performed at atmospheric pressure and under either gradually increasing temperature or a temperature which is elevated from time to time until the maximum desired temperature is reached. During the heat treatment after removal from the molds, the conversion of the phenolic body and hexamethylenetetramin to a hard resistant phenolic condensation product is mainly effected, with the elimination of the bulk of the ammonia which is formed in the re-action.

The heat treatment of the molded article preferably begins in the neighborhood of 100° F. and is raised to about 350° F., the treatment being continued preferably until the reaction is completed, which may require from one to several hours, depending upon the size and shape of the molded articles and other conditions. It is preferred to continue the treatment at a very moderate temperature until the evolution of any readily volatile ingredients has been effected and a sufficient transformation toward the insoluble condition has been effected to give the article the requisite tenacity to withstand a more rapid evolution of ammonia without blistering or danger of deformation; and after this tempering treatment, the temperature may be increased more rapidly until the maximum desired temperature is reached and the heat treatment may then be continued at the maximum temperature for a period of several hours. Usually it is desirable to carry on the heat treatment for a period of from 10 to 24 hours.

It will be noted that in producing the resin which is to be used as a binder, it is desirable to allow the re-action between the phenolic body and the methylene body to proceed until the re-action is about one-third completed, which can be determined readily by simply noting the loss of weight of the mass. The materials, in the preferred method of compounding, are used in proportions to afford substantially one phenolic group to each methylene group. This corresponds with about one mol of hexamethylenetetramin to six mols of the phenolic body.

It is desirable to employ substantially anhydrous materials which will produce an anhydrous re-action, and to effect the re-action substantially in the absence of water. Such a methylene-amin body as hexamethylenetetramin, which is a solid, may be used advantageously; and phenol, or a homologue, may be used. Some water may be present in the phenolic body as an impurity. Thus, three to five per cent. of water might be present in the cresol as an impurity, without seriously affecting the result. Even a larger amount of water might be present in the original mixture and be boiled off in that heating operation which facilitates the first condensation. The heating may be performed under pressure, proper provision being made for the escape and collection of the ammonia, but there is no advantage in using pressure in the first re-action.

It may be stated that usually the molding mixture is suitable for press-molding just as it comes from the disintegrator or pulverizer. However, if it is too damp, it may be further dried, or if it is too dry it may be dampened with coal tar oil. Also, it may be explained that if the binder proper when cold is too stiff to flow readily for the purpose of mixing with the filler, more coal tar oil may be introduced, or the binder may be warmed to render it more fluid just before mixing with the filler.

The proportions of cresol and hexamethylenetetramin noted above are approximately six mols of cresol to one mol of hexamethylenetetramin. These are about the proportions which are desirable in the final product, and correspond approximately with the molecular ratio. It would be possible, however, to use a smaller proportion of hexamethylenetetramin in the original mixture from which the resin is produced, and to subsequently add a sufficient amount of hexamethylenetetramin to give the desired proportions.

The phenolic body employed may be phenol, if desired. However, when phenol unites with hexamethylenetetramin under the application of heat in the manner described, the reaction may be violent, unless care is exercised in the application of the heat; and it is more difficult to arrest the reaction at the proper instant, assuming the full amount of hexamethylenetetramin to be introduced at the outset. In such case, it may be desirable to introduce a small percentage of a hydrocarbon solvent having a high-boiling point into the mixture at the outset, which will tend to make the reaction less violent. In any case, the use of a slowly volatile solvent having a boiling-point near or above the boiling-point temperature of the mixture of the phenolic body and hexamethylenetetramin is desirable, both because of the increased spreading, diffusing, or impregnating quality which it gives to the binder, and also because the use of such solvent serves to keep the materials in proper condition for molding for a comparatively long period of time; and in the heat treatment after the molding operation, the solvent having a high-boiling point acts as a tempering agent, and will not be driven off, whereas, the more usual solvents, such as alcohol, acetone, or a mixture of the usual solvents, would be rapidly driven off during the heat treatment, thereby tending to greater danger of blistering or deforming the molded article.

It is preferred to use, as a solvent, a light coal tar oil, or a higher-boiling-point fraction known as "shingle stain" oil. Any suitable oil derived from the distillation of coal tar or asphalt, with a boiling point which may range from about 135° C. (or lower) to 270° C. may be employed. Such an oil usually comprises a mixture of cyclic hydrocarbons which cannot be designated by definite formulæ.

The heat treatment of the molded articles may be performed advantageously in a closed oven, kiln or vulcanizer. Usually it is desirable to make provision for the escape and collection of the ammonia which is given off during the baking operation. The ammonia may be collected and used again, for instance, in preparing a fresh supply of hexamethylenetetramin.

Any suitable filler, such as asbestos, mica, flock, wood pulp, etc., may be employed. It is desirable to use, ordinarily, a high proportion of filler. In the case of asbestos, an excellent product is obtained by using 70% by weight of asbestos and 30% by weight of binder. The proportions may vary, however. In the first example given above, the binder is two-fifths of the weight of the asbestos fiber.

The molding operation can be readily performed. As high as 600 articles per hour can be obtained in case of small simple forms, and from 150 articles upward per hour may be obtained in the case of larger and more complicated shapes. The process results, therefore, in a vast economy in manufacture, as well as economy in the equipment for manufacturing molded phenolic condensation products.

It should be noted, also, that the use of a slowly-volatile solvent, that is, a solvent having a high boiling point, imparts to the molding compound a characteristic which prevents injury to the dies in the molding operation. In other words, this molding compound can be used without wearing off the sharp edges or corners of the dies, so that sharp outlines in the molded product may be secured for an indefinite time, and for a very large number of operations without renewing the dies. This is a very important consideration, and the result is doubtless due to the fact that the great body of the molding compound retains the solvent, even after there has been an apparent surface evaporation from the particles, or pellets, which make up the compound, so that the compound retains perfect plasticity, will flow properly in the dies, and will not cut the dies, even though the molding operation be not performed for a considerable time after the compound has been prepared. Were a readily volatile solvent, such as alcohol, acetone, or the like, to be employed, the result will be not only that the molding compound would not possess the necessary degree of plasticity to enable it to flow properly and weld properly in the dies, but also the compound would cause the dies to wear off rapidly in the molding operation.

As hereinbefore stated, phenol, or a homologue, or any suitable phenolic body, may be employed in practising the process. Recognized equivalent phenolic bodies in the art are, for example, phenol, the cresols, and the xylenols. The most desirable active methylene body for use in the process is the methylene-amin compound hexamethylene-tetramin. Another instance of a methylene-amin compound which might be used in the process is hydro-benzamid, or benzalde-hyde-amin. It may be stated, however, that this latter substance is too expensive at the present time to be economically employed in the process. It will be understood, of course, that variations within the scope of the process may be made, but it is highly desirable that the initial reaction be not permitted to proceed so far as to render the resin so viscous that it cannot be readily mixed with a filler at a lowered temperature (below the boiling point), or so far as to interfere with the perfect welding of the mass in a quick-molding operation. Thus, it is desirable that the reaction be quenched while less than half of the phenolic body is combined with the methylene radical, inasmuch as it becomes increasingly difficult, as the re-action progresses, to deal with the resin in such manner as to produce, by a quick-molding process, a molded product of the best qualities.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent is:

1. The process of producing a phenolic condensation product, which comprises: heating, in proportions to afford about one methylene group to each phenolic group, a mixture of a phenolic body and a non-volatile active methylene body which are capable of re-acting anhydrously to form a condensation product; arresting the re-action after an initial condensation product has been formed which has less than half of the phenolic body combined with the methylene radical; mixing together a filler and a binder comprising such initial product; forming the materials into a compacted body without converting the mass to an insoluble state; and subjecting said body to heat treatment to produce a hard resistant and substantially infusible body.

2. The process of producing a molded phenolic condensation product article, which comprises: heating, in proportions to afford about one methylene group to each phenolic group, a mixture of hexamethylenetetramin and a phenolic body adapted to combine therewith anhydrously to form a condensation product; arresting the re-action and lowering the temperature of the mass after an initial condensation product has been formed which has less than one-half of the phenolic body combined with the methylene radical and is readily fluid at a temperature below the boiling point; mixing together a filler and a binder comprising such initial product; subjecting the materials to a quick-molding operation under applied pressure; and subjecting the molded article, after removal from the mold, to heat treatment for a relatively long period to produce a hard resistant body.

3. The process of producing a phenolic condensation product, which comprises: heating, in proportions to afford about one methylene group to each phenolic group, a mixture of a phenolic body and a methylene-amin body which are capable of re-acting anhydrously to form a condensation product; arresting the re-action after an initial condensation product has been produced which has less than half of the phenolic body combined with the methylene radical; mixing together a filler and a binder comprising such initial product and a slowly-volatile solvent of high boiling point; compacting the molding compound to form a body before converting the binder to an infusible state; and subjecting such body to prolonged heat treatment to convert the same to a hard and substantially infusible state.

4. The process of producing a phenolic condensation product, which comprises: boiling together, in proportions to afford about one methylene group to each phenolic group, a mixture of a phenolic body and a non-volatile active methylene body which are capable of re-acting anhydrously to form a condensation product; arresting the re-action after there has been produced an initial phenolic condensation product; introducing a relatively small quantity of solvent of high boiling point, as a step in arresting said re-action, and lowering the temperature, thus obtaining an initial product of penetrating character; mixing together a fibrous filler and a binder comprising such initial product; compacting the materials and forming a body therefrom; and subjecting such body to prolonged heat treatment to convert the binder to a hard and substantially infusible state.

5. The process of producing a molded phenolic condensation product article, which comprises: heating, in proportions to afford about one methylene group to each phenolic group, a mixture of a methylene-amin body and a phenolic body which are adapted to combine anhydrously to form a condensation product; arresting the re-action after there has been formed a condensation product in which less than half of the phenolic body has combined with the methylene radical; introducing a hydrocarbon solvent of high-boiling-point as a step in producing an initial product of penetrating character, mixing together a fibrous filler and a binder comprising such initial product; subjecting the materials to drying and mechanical disintegrating treatment; subjecting the materials after such a disintegrating treatment to a quick-molding operation; and subjecting the molded article, after removal from the mold, to relatively prolonged heat treatment to produce a hard and substantially infusible body.

6. The process of producing a phenolic condensation product article, which comprises: heating, in proportions to afford substantially one methylene group to each phenolic group, a mixture of a phenolic body and a methylene body which are adapted to re-act anhydrously to form a condensation product, arresting the re-action after a condensation product has been formed in which less than half of the phenolic body has combined with the methylene radical; introducing a hydrocarbon solvent of high-boiling-point as a step in producing an initial product of penetrating character; mixing together a fibrous filler and a binder comprising such initial product; subjecting the materials to drying and mechanical disintegrating treatment; moistening the materials with a solvent after such disintegrating treatment; compacting the materials to form a body; and subjecting such body to prolonged heat treatment until the body becomes hard and substantially infusible.

7. The process of producing a molded phenolic condensation product article, which comprises: heating, in proportions to afford about one methylene group to each phenolic group, a phenolic body and hexamethylenetetramin; arresting the re-action after there has been produced a condensation product, in which less than half of the phenolic body has combined with the methylene radical; introducing a solvent of high boiling point as a step in producing an initial product of penetrating character; mixing together a filler and a binder comprising such initial product; subjecting the materials to a drying operation; then subjecting the materials to a mechanical disintegrating operation; subjecting the materials to a quick-molding operation under pressure; and subjecting the molded article, after removal from the mold, to prolonged heat treatment until a hard and substantially infusible body results.

8. The process of producing a molded phenolic condensation product article, which comprises: heating, in proportions to afford substantially one methylene group to each phenolic group, a phenolic body and a methylene-amin body adapted to re-act anhydrously to form a condensation product; introducing a solvent of high boiling point and arresting the re-action and lowering the temperature after there has been produced a phenolic condensation product in which less than half of the phenolic body has combined with the methylene radical; mixing together a fibrous filler and a binder comprising such initial product; drying and disintegrating the materials; moistening the materials after the disintegrating operation with a solvent; subjecting the materials to a quick high pressure molding operation; and subjecting the molded article, after removal from the mold, to prolonged heat treatment until a hard and substantially infusible body results.

9. The process of producing a molded article, which comprises: heating, in proportions to afford substantially one methylene group to each phenolic group, a mixture of a phenolic body and hexamethylenetetramin; introducing a hydrocarbon solvent of high boiling point as a step in arresting the re-action and producing an initial product of penetrating character; mixing together a fibrous filler taken in large proportion and a binder comprising such initial product; subjecting the materials to a quick-molding operation under heavy pressure; and subjecting the molded article, after removal from the mold, to prolonged heat treatment to produce a hard resistant body.

10. The process of producing a phenolic condensation product article, which comprises: heating a mixture of a phenolic body and a methylene-amin substance adapted to be combined anhydrously therewith to form a condensation product, said materials being taken substantially in proportions of one phenolic group to each methlyene group; arresting the re-action after such evolution of ammonia as corresponds with the union of about one-third of the phenolic body with the methylene-amin substance; introducing a solvent of high boiling point as a step in quenching the re-action and producing an initial product of penetrating character; mixing together a fibrous filler and a binder comprising such initial product; forming the materials into a compact body; and subjecting such body to prolonged heat treatment until it is converted to a hard, resistant and substantially infusible state.

11. The process of producing a molded phenolic condensation product article, which comprises: heating, in proportions to afford substantially one methylene group to each phenolic group, a phenolic body and a methylene-amin substance which are adapted to re-act anhydrously to form a condensation product, continuing the re-action until approximately one-third of the phenolic body has combined with the methylene radical; introducing a solvent of high boiling point as a step in producing an initial product of penetrating character; mixing together a fibrous filler and a binder comprising such initial product; subjecting the materials to a quick-molding operation under pressure; and hardening the molded article, after removal from the mold, by prolonged heat treatment.

12. The process of producing a molded phenolic condensation product, which comprises: heating a mixture of a phenolic body and hexamethylenetetramin taken in proportions affording substantially one methylene group to each phenolic group; introducing a solvent of high boiling point as a step in arresting the re-action before one-half of the phenolic body has combined with the methylene radical, thus producing an initial product of penetrating character; mixing together a fibrous filler in relatively large proportion and a binder comprising such initial product; and subjecting the materials to a molding operation under pressure and heat treatment to produce a hard resistant body.

13. The process of producing a molded phenolic condensation product, which comprises: heating a mixture of a phenolic body and hexamethylenetetramin taken in proportions affording substantially one methylene group to each phenolic group; introducing a solvent of high boiling point as a step in arresting the re-action before one-half of the phenolic body has combined with the methylene radical, thus producing an initial product of penetrating character; mixing together a fibrous filler in relatively large proportion and a binder comprising such initial product; subjecting the mixture to a drying operation and then to a mechanical disintegrating operation; and subjecting the materials after the disintegrating operation to a molding operation under pressure and heat treatment to produce a hard resistant body.

14. The process of producing a molded phenolic condensation product, which comprises: heating a mixture of a phenolic body and hexamethylenetetramin taken in proportions affording substantially one methylene group to each phenolic group; introducing a solvent of high boiling point as a step in arresting the re-action before one-half of the phenolic body has combined with the methylene radical, thus producing an initial product of penetrating character; mixing together a fibrous filler in relatively large proportion and a binder comprising such initial product; subjecting the mixture to a drying operation and then to a mechanical disintegrating operation; moistening the materials after the disintegrating operation with a hydrocarbon solvent of high boiling point; and subjecting the materials to a molding operation under pressure and heat treatment to produce a hard resistant body.

LINWOOD T. RICHARDSON.